Oct. 30, 1934.

F. W. PETERS 1,978,689

SEALING MEANS

Filed Jan. 25, 1933

Inventor
Frederick W. Peters,
By Hull, Brock & West,
Attorneys

Patented Oct. 30, 1934

1,978,689

UNITED STATES PATENT OFFICE 1,978,689

SEALING MEANS

Frederick W. Peters, Cleveland, Ohio

Application January 25, 1933, Serial No. 653,439

1 Claim. (Cl. 286—7)

This invention relates generally to means for sealing against leakage shafts such as are employed with pumps or compressors, wherein the shaft passes through a wall subjected to different pressures on opposite sides thereof.

The general purpose and object of the invention is to provide for such shafts sealing means which will be extremely efficient in preventing fluid, subjected to pressure, from leaking from the high-pressure side of the wall to the low-pressure side thereof.

A further object of the invention is to provide sealing means of the character referred to which are simple in construction, economical of production, and which, while being efficient in operation, are capable of production at comparatively low cost, as well as capable of quick and ready installation.

Further and more limited objects of the invention will appear in the detailed description hereof and will be clearly understood by those skilled in the art to which this invention relates.

Figure 1:
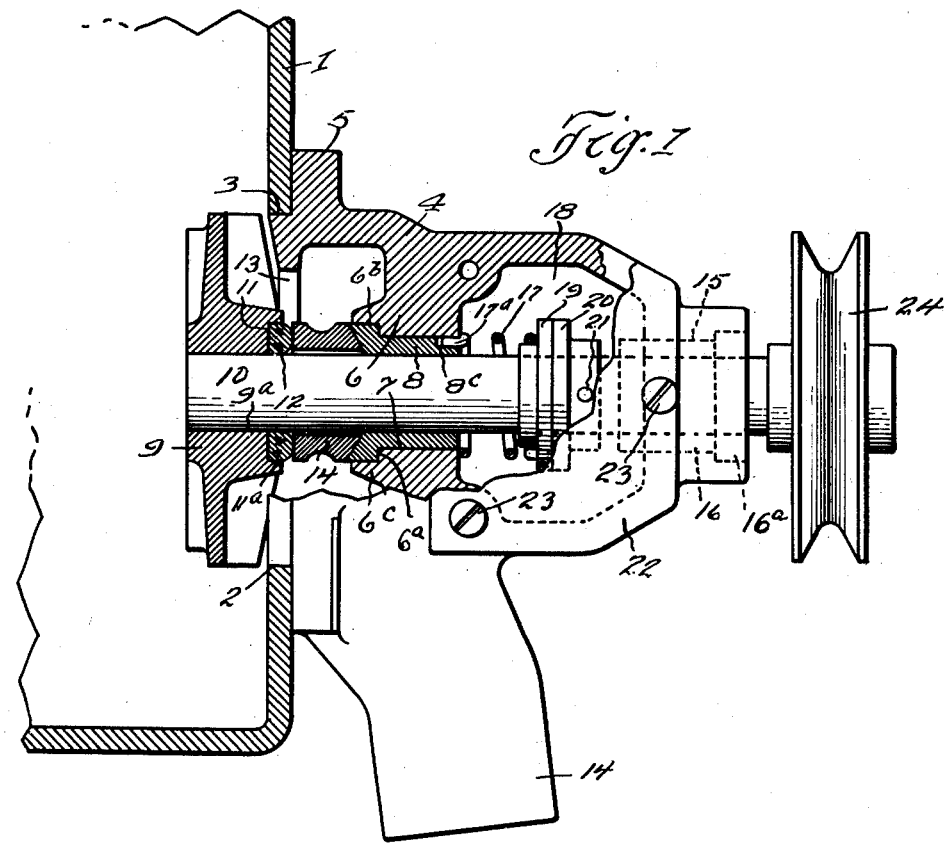
Figure 2:
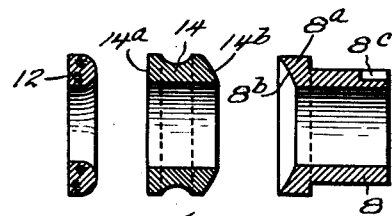

Referring to the drawing, Fig. 1 represents a sectional elevation of a pump employing my invention and showing the same attached to a fluid-containing receptacle in which the impeller operates; and Fig. 2 is a detail in section showing the sealing members.

Describing the various parts by reference characters, 1 represents one of the walls of a chamber within which the impeller is adapted to operate, which chamber may be provided within the cylinder block of an engine and constitute part of the water-circulation system, the said chamber being provided with an opening 2 in one of the side walls thereof which is adapted to permit the passage of the impeller therethrough and to have fitted therewithin an annular shoulder 3 on the inner end of a casing 4, the said casing having a flange 5 which is adapted to engage the wall 1 surrounding the opening 2 and by means of which flange the casing and the parts associated therewith may be secured to the said wall, as by means of bolts (not shown).

The casing 4 is provided with a radially inwardly projecting wall 6 having a cylindrical opening 7 therethrough providing an elongated bearing for the bushing 8, the said bushing being made of bronze and preferably of the particular type of bronze which is impregnated with oil and known as "Oilite". The bushing extends through the bearing 7 toward the impeller 9, which is located within the chamber formed in part by the wall 1, and which impeller is secured to the shaft 10. The end of the bushing which projects beyond the bearing 7 toward the impeller is enlarged in diameter to provide an integral ring $8^a$, said ring having a spherical surface $8^b$ presented toward the impeller and an annular shoulder adapted to engage the annular surface $6^a$ between the bore in the wall 6 and the cylindrical bore $6^b$ which is formed within the wall extension $6^c$, the bore $6^b$ surrounding and engaging the outer surface of the ring $8^a$.

11 denotes an annular recess formed within the hub of the impeller, the recess extending outwardly from the central bore $9^a$ of said hub. Within this recess there is inserted a ring 12 of compressible material, preferably cork, and the external diameter whereof, before insertion into the recess 11, is greater than the diameter of the cylindrical wall $11^a$ of said recess whereby the ring is held under compression between the shaft 10 and the said cylindrical wall, the ring projecting into the space 13 which receives water or other fluid forced by said impeller through the said space and through the outlet connection $14^a$. The cork of which the ring 12 is composed may be ordinary cork or a composition including cork in a ground condition, such as is frequently used for packing purposes. The casing 1, as stated hereinbefore, may be part of the cylinder block of an engine, and the outlet connection $14^a$ may be used to deliver water from said cylinder block to the radiator of an automobile.

Interposed between the ring $8^a$ and the ring 12 is a ring 14, the last mentioned ring having at one end an annular flat surface $14^a$ adapted to bear against the outer face of the ring 12 and having at its opposite end a spherical surface $14^b$ of the same curvature as and adapted to engage and cooperate with the spherical surface $8^b$ of the ring $8^a$. The ring 14 is of greater diameter than the shaft 10, whereby it may "float" with respect to said shaft and thus automatically adjust itself to accommodate any misalignment of the shaft in the bearing 7 and in the bearing 15 at the opposite end of the casing, there being a bushing 16 in the bearing 15 having a running fit on the shaft and a lubricant retainer $16^a$ beyond the bushing 16.

The cooperating surfaces of the rings $8^a$, 14 and 12 are held in engagement with one another by means of a spring 17 which is located in a lubricant chamber 18 in the casing 4, one end of the spring bearing against the adjacent end of the wall 6 and having at such end a pin $17^a$ which enters a hole 8c provided therefor in the bushing 8. The opposite end of the spring bears against one member 19 of a compound thrust washer, the member 19 being preferably of bronze and being backed by a member 20, which is preferably of steel and which is secured to the shaft 10, as by means of a pin 21.

The lubricant chamber 18 of the casing is provided with a cover 22 which is removably secured to the casing as by means of screws 23. The end of the shaft 10 which is remote from the impeller is shown as provided with a driving pulley 24.

The spherical surfaces $8^b$ and $14^b$ and the surface $14^a$ are coin-pressed to eliminate any irregularities and to insure an effective seal between the contacting surfaces of the rings $8^a$, 12 and 14.

Due to the floating action of the ring 14 and to the compressibility of the ring 12, the sealing members accommodate themselves automatically to any misalignment of the shaft or bearings as well as to any wear of the bearings, thereby to provide a leak-proof seal at all times, preventing the passage of fluid beyond said rings and the wall 6.

Having thus described my invention, what I claim is:

In a device of the class described, a casing, a rotor, a shaft carrying said rotor, an opening in said casing, a bearing composed of lubricant impregnated metal received in said opening in fluid tight contact, a depression in one face of said rotor, an annular member received in said depression in fluid tight contact, projecting outwardly beyond the face of said rotor and surrounding said shaft, said shaft passing through said bearing, said bearing being provided with a part spherical surface, a second annular member surrounding said shaft, interposed between said bearing and said first annular member, provided with a complementary part spherical surface adapted to engage the spherical surface of said bearing and rotate with respect thereto to form a seal and a surface adapted to engage said first annular member in sealing relation, said second annular member having an internal diameter considerably greater than the diameter of said shaft, and means for constantly urging said annular members and said bearing into sealing contact with each other.

FREDERICK W. PETERS.